United States Patent
Prchal et al.

(10) Patent No.: US 9,311,657 B2
(45) Date of Patent: Apr. 12, 2016

(54) PROVISIONING OF LOCATION-BASED CONTENT DURING A CUSTOMER SERVICE SESSION

(75) Inventors: Ken Prchal, Seattle, WA (US); Mark Slusar, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 376 days.

(21) Appl. No.: 13/431,694

(22) Filed: Mar. 27, 2012

(65) Prior Publication Data

US 2013/0260794 A1 Oct. 3, 2013

(51) Int. Cl.
| | |
|---|---|
| H04W 24/00 | (2009.01) |
| G06Q 30/02 | (2012.01) |
| G06Q 30/00 | (2012.01) |
| H04M 3/42 | (2006.01) |
| H04L 29/06 | (2006.01) |
| H04L 29/08 | (2006.01) |

(52) U.S. Cl.
CPC .......... G06Q 30/0261 (2013.01); G06Q 30/016 (2013.01)

(58) Field of Classification Search
CPC .................................................... H04W 24/00
USPC ....................................................... 455/456.3
See application file for complete search history.

(56) References Cited

U.S. PATENT DOCUMENTS

| | | | | |
|---|---|---|---|---|
| 2002/0077130 | A1* | 6/2002 | Owensby | 455/466 |
| 2012/0220314 | A1* | 8/2012 | Altman et al. | 455/456.3 |
| 2013/0051545 | A1* | 2/2013 | Ross et al. | 379/265.02 |

FOREIGN PATENT DOCUMENTS

| | | |
|---|---|---|
| EP | 1 146 496 B1 | 8/2007 |
| EP | 1 376 059 B1 | 7/2009 |
| EP | 1376059 B1 * | 7/2009 |

OTHER PUBLICATIONS

International Search Report cited in PCT/EP2013/053750, mailed Jul. 5, 2013.

* cited by examiner

*Primary Examiner* — Huy C Ho
(74) *Attorney, Agent, or Firm* — Lempia Summerfield Katz LLC

(57) ABSTRACT

The disclosed embodiments relate to a system or method of providing location-based content during a customer service session between a mobile device of a customer service requestor and a communication device associated with a customer service provider via a communication channel. The disclosed method includes establishing the customer service session between the customer service provider and the mobile device of the customer service requestor. The method also includes determining, by a processor, a geographic location of the mobile device. The method further includes providing, by the processor, during or after the customer service session, to the customer service requestor via the mobile device, content based on the determined geographic location of the mobile device.

20 Claims, 7 Drawing Sheets

PROVISIONING OF LOCATION-BASED CONTENT DURING A CUSTOMER SERVICE SESSION

BACKGROUND

A customer service session may be generally defined as a connection, via a communication channel, between a customer service provider (provider) and a customer service requestor (requestor) during which customer service is exchanged. A customer service session may be frustrating, stressful, and/or counter-productive for both the provider and the requestor. At the outset, the requestor, who is attempting to obtain, solicit, or receive customer service from the provider, is often angry, upset, and/or anxious about having to obtain customer service in the first place (e.g., the customer may be frustrated that his/her new product or service isn't working properly). These feelings may be exacerbated by the fact that the requestor attempting to obtain, solicit, request, or receive customer service from the provider must often wait to receive customer service, as available customer service resources (e.g., customer service employees, phones, computers, etc.) are typically limited. Thus customers calling to obtain customer service, are, for example, often placed on hold, and, thus, must endure a wait or delay before or while receiving or obtaining customer service. In some cases, the delay or wait may be significant (e.g., 60 minutes). This may leave the requestor, even after receiving the requested customer service, extremely frustrated, angry, or otherwise upset or dissatisfied about or with the customer service session and/or the provider in general.

Customer service plays an important role in determining the provider's ability to attract new customers and retain existing customers, and, thus, the provider's ability to generate income and revenue. Poor customer service and/or a reputation for poor customer service may, as a result, make it difficult for the provider to attract new customers and/or retain existing customers, ultimately leading to lost business. For example, an existing customer who endures a poor customer service experience may decide to never again purchase goods and/or services from the provider (by, for example, switching brands or service providers). Likewise, a potential new customer who hears about this poor customer service session or the provider's poor customer service reputation may choose to purchase goods and/or services from a different provider.

Recognizing the importance of customer service, providers have adopted various strategies to improve or enhance the quality of customer service that they provide. More specifically, some providers have adopted a strategy known as customer relationship management (CRM), which involves using technology to automate, analyze, organize, and synchronize communication between the respective provider and the requestor during the customer service process. Providers may, for example, use CRM software to create, assign, and manage customer service requests made by customers. Accordingly, CRM software may, as an example, direct a customer to the customer service agent best suited to help the customer with his/her problem.

BRIEF DESCRIPTION OF THE DRAWINGS

The examples of the invention described below can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION OF THE DRAWINGS AND PRESENTLY PREFERRED EMBODIMENTS

The disclosed embodiments relate to a customer service platform that provides location based content during a customer service session or experience, as will be described. A customer service session, as described above, may be defined as a connection, via a communication channel, between an employee, representative, and/or automated online assistant (e.g., interactive voice response ("IVR") system, chatterbot) of or associated with one or more customer service providers (provider(s)) and one or more customer service requestors (requestor(s)) during which customer service is exchanged. The one or more providers may be a retailer or merchant, manufacturer, distributor, service provider, and/or organization (e.g., corporation, government entity, other business entity). The one or more customer service requestors may be actual or potential customers, users, and/or consumers of one or more goods and/or one or more services. The customer service may include audio, visual, and/or audio-visual customer support (e.g., billing and/or other non-technical issues), technical support (e.g., schedule an appointment and/or service call or visit, troubleshooting, maintenance, problem diagnosis, installation, training, etc.), and/or other customer-related support (e.g., add and/or cancel one or more products and/or one or more services). The communication channel may include a telephone network, electronic mail (email), and/or some form of real-time direct text-based chatting (e.g. SMS, MMS, chat, instant messaging). The communication channel may be accessed, established, and/or initiated via one or more communication devices, such as a landline telephone, a desktop computer, and/or a mobile device, such as a mobile phone and/or a mobile content platform (e.g., notebook computer, tablet computer).

Known customer service strategies, such as CRM, described above, may be expensive and difficult to implement. Implementing CRM often requires significant planning, particularly for large organization, as CRM software must be integrated into existing information technology infrastructure and employees must be trained to use the new CRM software. Customer service requestors may also find the CRM software difficult to use and/or understand. For example, the CRM software may be difficult to navigate and/or may, especially at first, contain previously undiscovered technical gaps. CRM software, even if more effective than other customer service processes at delivering quality customer service, is also not guaranteed to eliminate or address the above-noted problems with customer service—customer service requestors may still be placed on hold and be forced to endure a wait or delay before or while receiving or obtaining customer service. In the end, CRM software may still leave the one or more customer service requestors, even after receiving the requested customer service, extremely frustrated, angry, or otherwise upset or dissatisfied about or with the customer service session and/or the customer service provider in general.

The disclosed embodiments aim to create a more pleasant customer service process by offering, providing, or transmitting location based content to the one or more customer service requestors during the customer service session. The location-based content may include a compensatory benefit redeemable at a location proximate or near the customer service requestor, locations to travel to or avoid during the customer service process, route guidance, information about friends, family, and/or social acquaintances derived from a location-based social networking application. Although the location-based content may not completely eliminate delay or on hold time and/or other sources of frustration, anxiety, or dissatisfaction for the customer service requestor with the customer service process, providing location-based content may improve the customer service experience and help placate the customer service requestor and/or help the requestor feel appreciated and/or remain productive, happy, and mobile, even during the ongoing customer service session. This should, in turn, improve the customer service requestor's customer service experience, thereby producing a happier and, ideally, more loyal customer. Accordingly, this may help the customer service provider attract new customers and/or retain existing customers, in a simple and cheaper way than the known customer service strategies discussed above.

To clarify the use in the pending claims and to hereby provide notice to the public, help other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 1:
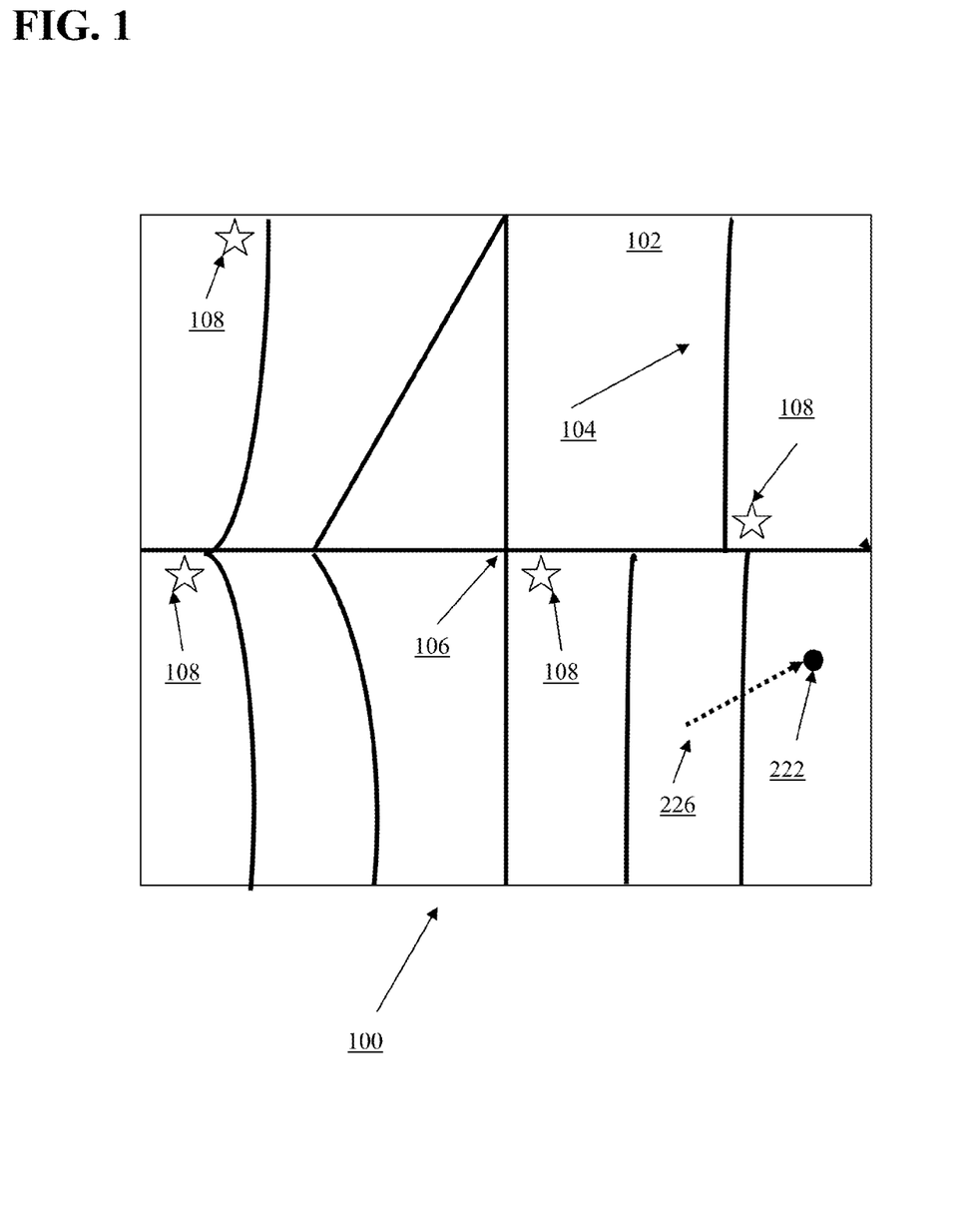
FIG. 1 depicts a map of an exemplary geographic region.

FIG. 1 shows a map 100 of a geographic region 102. The geographic region 102 may correspond to a metropolitan or rural area, a state, a country, or combinations thereof, or any other area of comparable size. The geographic region 102 includes, among other things, roads 104 and intersections 106. The geographic region 102 further includes one or more points of interest 108, such as businesses (e.g., retailers, merchants, service providers, other businesses, etc.), municipal entities, public transportation venues or steps, and/or other points of interest not explicitly described herein.

Figure 2:
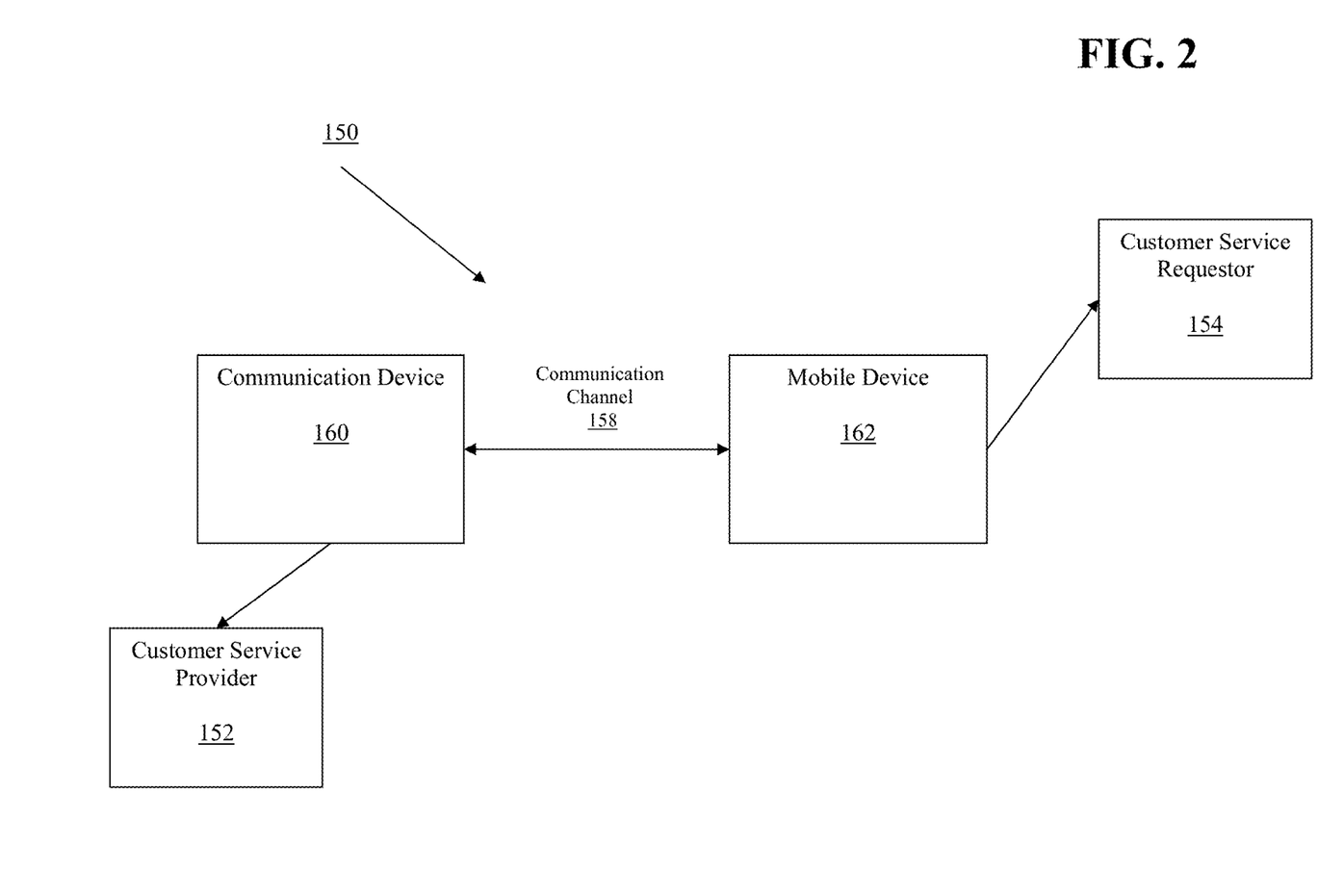
FIG. 2 depicts a block diagram of a customer service session according to one embodiment.

FIG. 2 shows a block diagram of a customer service session 150 according to one embodiment. The customer service session 150 is established between a customer service provider 152 and a customer service requestor 154 seeking to obtain customer service 156 via or over a communication channel 158. In this embodiment, the communication channel 158 is a telephone network, such that the customer service session 150 is established, via the telephone network 158, between a communication device 160 associated with the customer service provider 152 and a mobile device 162 owned by or otherwise associated with the customer service requestor 154. The customer service requestor 154 is, in this embodiment, located in the geographic region 102. The customer service provider 152 may also be located in the geographic region 102 or may, in some embodiments, be located outside of the geographic region 102.

The customer service session 150 may be established in any number of ways. In one embodiment, the customer service session 150 may be initiated by the customer service requestor 154, via the mobile device 162, when the requestor 154 contacts (e.g., calls or telephones) or messages (e.g., SMS, chat) the customer service provider 152. The customer service session 150 is established, in response to this initiation, by the customer service provider 152, when the customer service provider 152, via the communication device 160, answers or accepts the contact or responds to the message from the requestor 154. Alternatively, the customer service session 150 may be initiated by the customer service provider 152, via the communication device 160, and established by the customer service requestor 154 via the mobile device 162. The customer service provider 152 may, for example, initiate the customer service session 150 in response to an initiation request received from the customer service requestor 154. Alternatively, the customer service provider 152 may initiate the customer service session 150 based on one or more previous customer service sessions, in which, for example, the customer service provider 152 indicates that it will contact the customer service requestor when it is his/her turn in the customer service queue. One of ordinary skill in the art will realize that the customer service session 150 and/or other customer service sessions may be initiated and/or established in a different manner, particularly when the customer service session is established via or over a different communication channel than the telephone network 158.

Figure 3:
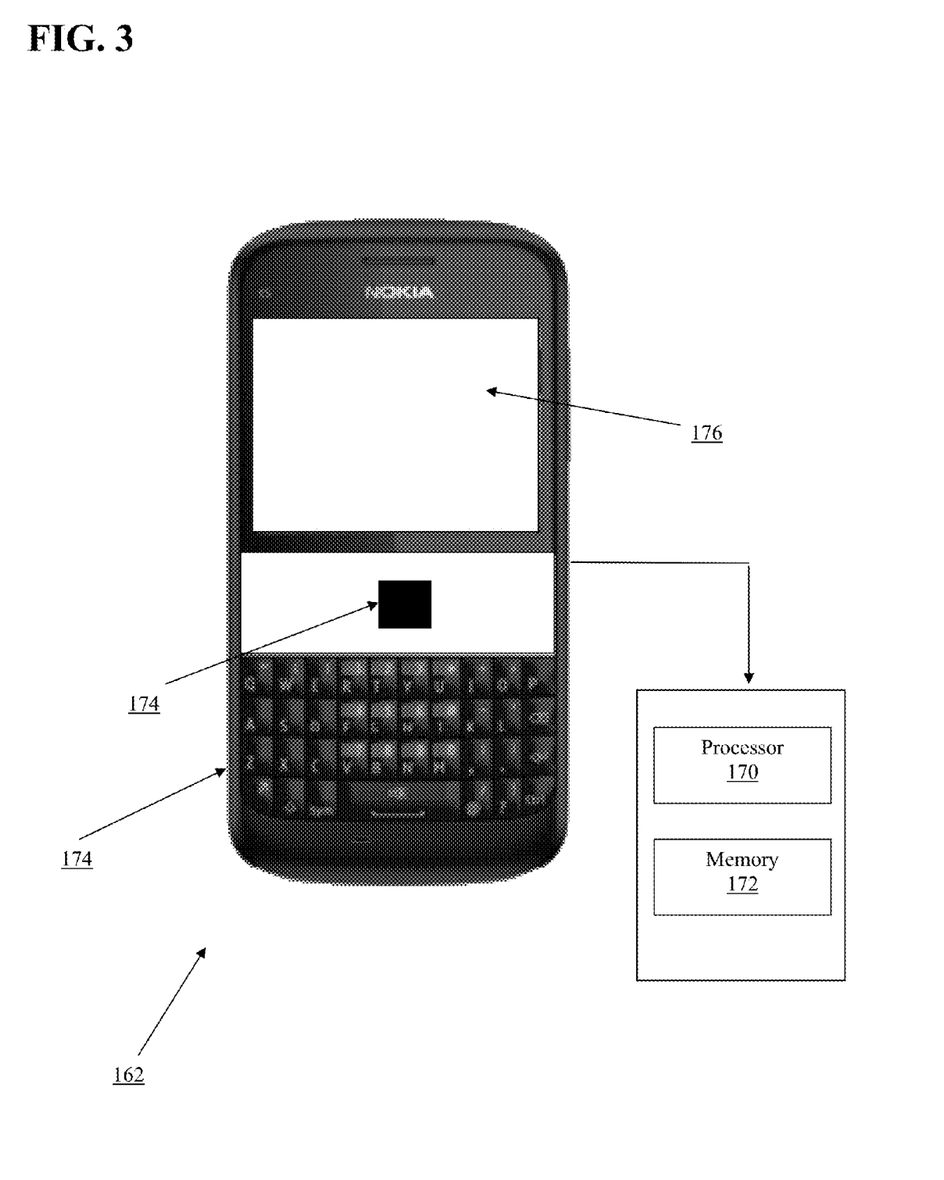
FIG. 3 depicts an example of a mobile device associated with the customer service requestor.

FIG. 3 shows a more detailed view of the mobile device 162. The mobile device 162 may be a mobile phone, a smart phone, a personal digital assistant ("PDA"), a tablet computer, a notebook computer, a personal navigation device ("PND"), a portable navigation device, and/or any other portable or mobile device associated with the requestor 154. In this embodiment, the mobile device 162 includes a processor 170, a memory 172, an input device 174, and a display 176.

The processor 170 may be any type of processor suitable for mobile devices and/or computers. The memory 172 may be a volatile memory or a non-volatile memory. The memory 172 may include one or more of a read only memory (ROM), random access memory (RAM), a flash memory, an electronic erasable program read only memory (EEPROM), or other type of memory. The memory 172 may include an optical, magnetic (hard drive) or any other form of data storage device. The memory 172 may be removable from the mobile device 162 (e.g., may be a secure digital (SD) memory card).

The input device 174 may be one or more buttons, keypad, keyboard, mouse, stylist pen, trackball, rocker switch, touch pad, voice recognition circuit, or other device or component for inputting data to the mobile device 162. The display 176 may be a liquid crystal display (LCD) panel, light emitting diode (LED) screen, thin film transistor screen, or another type of display. In one embodiment, the input device 174 and the display 176 of the mobile device 162 are combined as a touch screen display, which may be capacitive or resistive.

Figure 4:
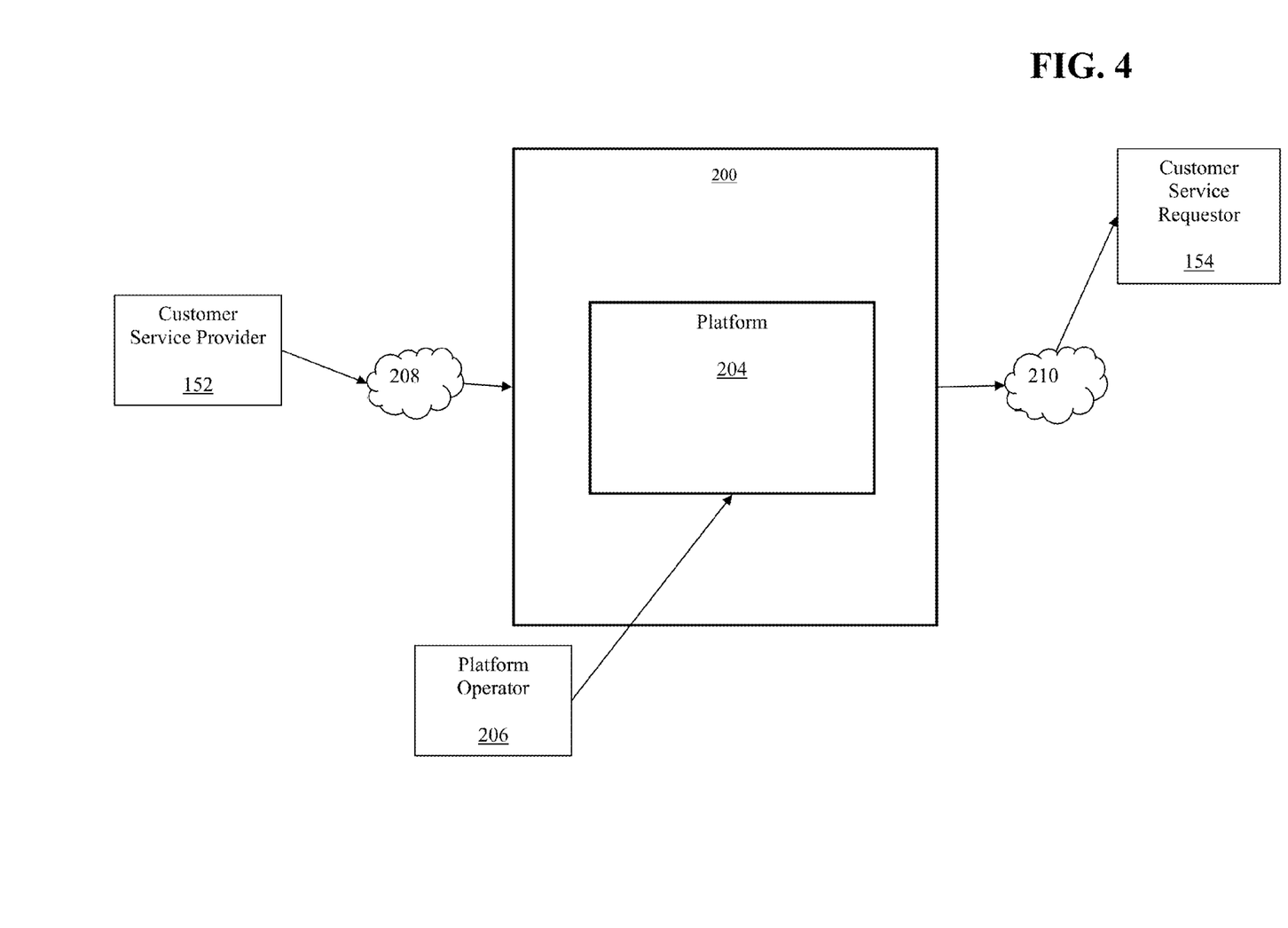
FIG. 4 depicts a block diagram of an example of a system for providing location-based content, during the customer service session shown in FIG. 2, to a customer service requestor located in the geographic region shown in FIG. 1.

FIG. 4 shows a block diagram of one system 200 for providing location based content 202 during the customer service session 150. The system 200 includes a customer service platform 204 created or operated by, or otherwise associated with, a customer service platform operator 206. In one embodiment, the platform operator 206 is the same as the customer service provider 152. The customer service platform 204 is coupled with the customer service provider 152 (and the communication device 160 associated therewith) via a wired and/or wireless network 208. The platform 204 may be located at, proximate, or near the customer service provider 152 or may be remotely located from the customer service provider 152. The customer service platform 204 is coupled with the customer service requestor 154 (and the mobile device 162 associated therewith) via a wired and/or wireless network 210. In one embodiment, the network 208 may be the same as the network 210 (and vice-versa). Herein, the phrase "coupled with" is defined to mean directly connected to or indirectly connected through one or more intermediate components. Such intermediate components may include both hardware and software based components. In one embodiment, the platform 204 may be implemented as computer program logic or computer readable program code stored in the memory and/or storage of a computer, such as the computer 400 described below with respect to FIG. 7, and executable by one or more processors thereof to implement the disclosed functionality.

The networks 208 and 210 may be a wireless network or a combination of a wired and wireless network, such as a cellular telephone network and/or 802.11x compliant network, and may include a publicly accessible network such as the Internet, a private network, or combination thereof. It will be appreciated that the type and configuration of the communications networks 208 and 210 is implementation dependent and any type of communications network which facilitates the described communications between the platform 204 and the customer service provider 152 and/or the customer service requestor 154, available now or later developed, may be used.

Figure 5:
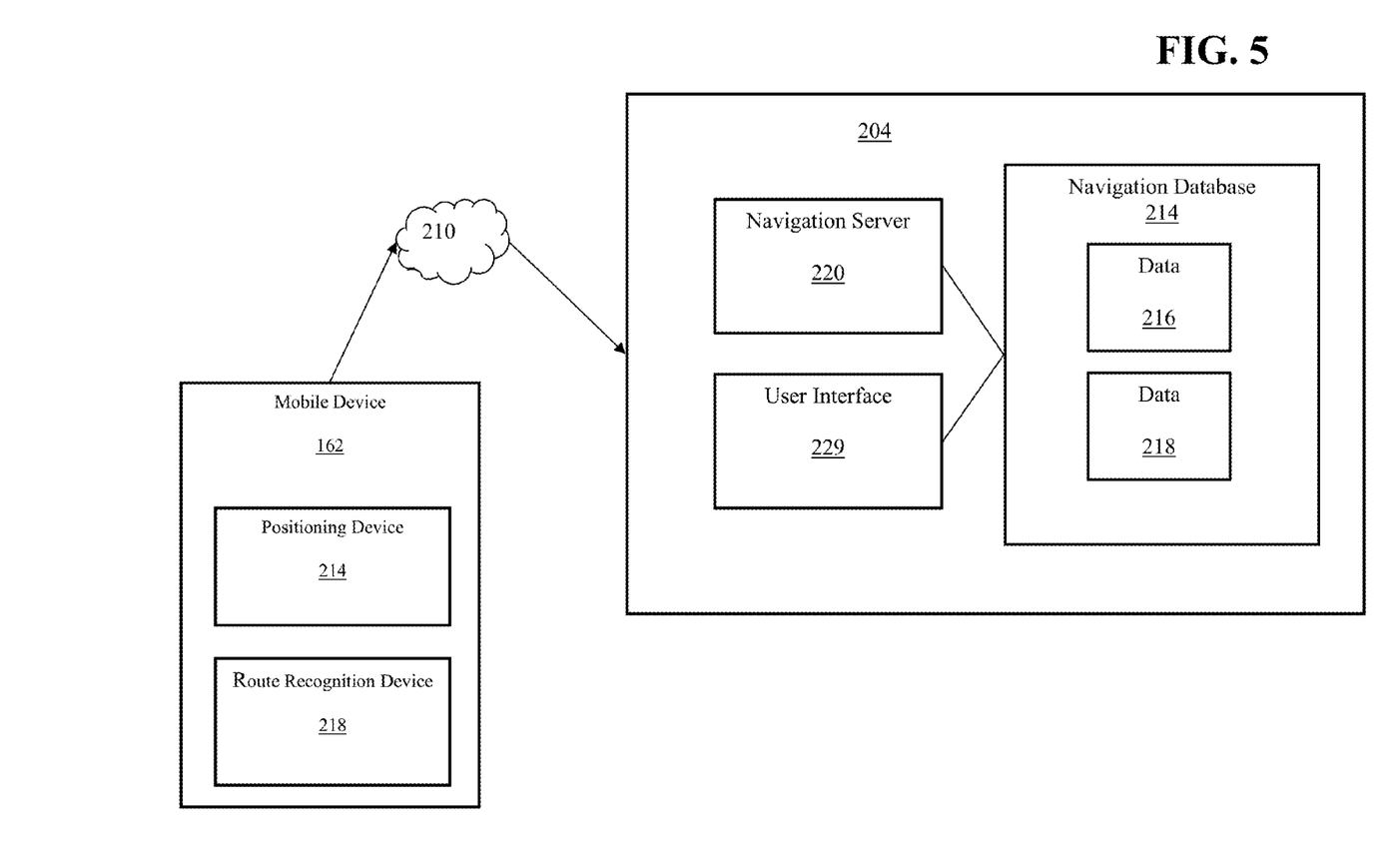
FIG. 5 depicts a customer service platform of the system of FIG. 4 in communication with a mobile device associated with the customer service requestor.

As illustrated in FIG. 5, the platform 204 includes a navigation system 212. The navigation system 212 includes a navigation database 214. The navigation database 214 contains geographic data 216, such as, for example, road segment or link data records 180, node data records 182, and point of interest data records 184. The link data records 180 are links or segments representing the roads, streets, or paths 104. The node data records 182 are end points corresponding to the respective links or segments of the road segment data records 180. The road link data records 180 and the node data records 182 represent a road network, such as used by vehicles, cars, and/or other entities. The road link data records 180 may be associated with attributes of or about the roads 104, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The node data records 182 may likewise be associated with attributes (e.g., about the intersections 106), such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The point of interest data records 184 may be associated with attributes of or about one or more points of interest 108, such as an address, a phone number, and/or hours of operation for the point of interest 108, and/or the availability and/or strength of the telephone network 158 and/or one or more other communication channels (e.g., internet, telephone network, etc.) at the point of interest 108. The geographic data 216 may also include other data records 186, such as, for example, cartographic data records, routing data, and maneuver data. More, fewer, or different data records may be provided.

The navigation database 214 further contains offer data 218 associated with one or more of the points of interest 108. The offer data 218 is indicative of one or more benefits, discounts, promotions, vouchers and/or coupons, valid, redeemable, or usable at the respective point of interest 108, which may be offered or provided to the customer service requestor 154 during the customer service session 150. For example, the offer data 218 may indicate that the customer service requestor 154 may be offered, during the customer service session 150, a discount of 50% off coffee at the coffee shop 108. To prevent fraud, the offer data 218 may indicate that the respective benefit, discount, promotion, and/or coupon may only be offered and/or used a set number of times total and/or a total number of times per day/hour/etc.

The navigation database 214 may be maintained by the customer service platform operator 206 and/or a map developer 120 (e.g., NAVTEQ NA LLC). The map developer 120 collects geographic data to generate and enhance the database 214. There are different ways used by the map developer 120 to collect data. These ways include obtaining data from other sources, such as municipalities or respective geographic authorities. In addition, the map developer may employ field personnel to travel by vehicle along roads throughout the geographic region to observe features and/or record information about them. Also, remote sensing, such as aerial or satellite photography, may be used.

The navigation database 214 may be a master geographic database stored in a format that facilitates updating, maintenance, and development. For example, the master navigation database 214 or data in the master navigation database 214 is in an Oracle spatial format or other spatial format, such as for development or production purposes. The Oracle spatial format or development/production database may be compiled into a delivery format, such as a GDF format. The data in the production and/or delivery formats may be compiled or further compiled to form navigation database products or databases, which may be used in end user navigation devices or systems.

The navigation system 212 also includes a navigation server 220. The server 220 is operative to determine or obtain a geographic location or position 222 of the mobile device 162 (and, thus, the customer service requestor 154) in the geographic region 102 (see FIG. 1). In the embodiment depicted in FIG. 5, the server 220 is operative to receive or obtain, via the network 210, the position 222 from a positioning system 224 included on or with the mobile device 162. The positioning system 224 is operative to obtain or determine the position 222 using, for example, a global positioning system (GPS), an assisted GPS system, inertial sensors, wheel pulse sensors, other sensors, and/or any other known or later developed way of determining position. See, for example, the contents of U.S. Pat. No. 6,192,312, titled "Position determining program and method," the entire disclosure of which is incorporated by reference herein. Once the positioning system 224 determines or obtains the location 222, the positioning system 224 of the mobile device 162 may transmit its location or position 222 to the server 220 via the network 210. This may be done or performed in response to a request from the navigation server 220 and/or may be caused to occur by the customer service requestor 154 and/or may be automatically done periodically at set time intervals (e.g., every 2 minutes) during the customer service session 150.

The server 220 is further operative to determine or obtain a route 226 (see FIG. 1, dashed line) over which the mobile device 162 is or will be traveling. In the embodiment depicted in FIG. 5, the server 220 is operative to receive or obtain, via the network 210, the route 226 from a route recognition system 228 included on or with the mobile device 162 and coupled with the positioning device 224. The route recognition device 228 may recognize the route 226 based on one or more previous routes over which the mobile device 162 has traveled. For example, the customer service requestor 154, and, thus, the mobile device 162 may travel the same route to and from work every day. Accordingly, if the positioning device 224 determines that the location 222 of the mobile device 162 is along, on, or near this habitual route, the route recognition device 228 may determine that the mobile device 162 is traveling to or from work, such that route 226 is the habitual route to or from work. The route recognition device 228 may alternatively determine the route 226 based on two or more different geographic locations or positions 222 of the mobile device 162 and/or the geographic location or position 222 and a list or database of commonly traveled routes. Once the route recognition device 228 determines or obtains the route 226, the route recognition device 228 may transmit the route information 226 to the server 220 via the network. As with the location 222, above, the route information 226 may be transmitted in response to a request from the navigation server 220 and/or may be caused to occur by the customer service requestor 154 and/or may be automatically done periodically at set time intervals (e.g., every 2 minutes) during the customer service session 150.

In another embodiment, the navigation server 220 may obtain the geographic location or position 222 and/or the route 226 of the mobile device 162 directly from or through the customer service requestor 154. For example, the server 220 may directly prompt the customer service requestor 154 for his/her location 222 and/or his/her route 226. The requestor 154 may, in response, directly provide his/her location 222 and/or route 226 and/or cause his/her mobile device 162 to provide his/her location 222 and/or route 226 to the server 220. Alternatively, the server 220 may request that the customer service provider 152 request or obtain the location 222 and/or the route 226 from the customer service requestor 154. The requestor 154 may respond, or cause his/her mobile device 162 to respond, by informing the customer service provider 152 of his/her geographic location or position 222 and/or his/her planned route 226. The customer service provider 152 may then transmit the location 222 and/or the route 226 to the server 220 via a user interface, as will be described below, or in any number of ways. In yet another embodiment, the navigation system 212 may include the positioning system 224 (or any other device operable to determine the location 222) and/or the route recognition system 228 (or any other device operable to determine the route 226). In such a case, the positioning system 224 may determine the location 222 of the mobile device 162 using or based on, for example, triangulation methods, the Internet Protocol (IP) address of the mobile device 162, etc. The navigation server 220 may then obtain or receive the location 222 from the positioning system 224 and/or the route 226 from the route recognition system 228 within the platform 204. In a further embodiment, the navigation database 214, or parts or data thereof, may be stored in or be part of the mobile device 162. This may, for example, allow the mobile device 162 to get data instructions from the server 220 and to, for example, generate navigational guidance (e.g., a route) on the display 176 of the mobile device 162.

The server 220 may, in turn, provide or present the customer service provider 152 with an audio description and/or visual indication of the location 222 and/or the route 226. In one embodiment, the server 220 may provide the customer service provider 152 with the map 100 or a different map that depicts or illustrates the location 222 and/or the route 226 of the mobile device 162 (See FIG. 1). In some embodiments, this may help the customer service provider 152 identify or select the content 202 to provide during the customer service session 150.

The navigation system 212 may also include a user interface 229 that allows the customer service provider 152 and/or platform operator 206 to modify the data 216 and/or the offer data 218 stored in the navigation database 214 and/or add and/or remove similar information thereto/therefrom. In the embodiments described above in which the customer service provider 152 obtains the location 222 and/or the route 226 directly from the customer service requestor 154, the customer service provider 152 may enter the location 216 and/or the route 220 via the user interface 229.

Optionally, the platform 204 may be operative to provide, via the telephone network 158 or another communication channel, the customer service requestor 154 with queue information 230 during the customer service session 150, but before the requestor 154 receives the customer service 156. The queue information 230 may include an estimated waiting or hold time and/or a priority rank (e.g., the requestor 154 is currently $8^{th}$ in line) for the requestor 154 before the requestor will receive the customer service 156 during the customer service session 150.

In some embodiments, the location 222 and the route information 226 received from the mobile device 162 and/or the customer service provider 152 and/or the customer service requestor 154 may already indicate where the customer service requestor 154 (and the mobile device 162) is relative to or with respect to the roads 104, the intersections 106, and/or the points of interest 108 in the geographic region 102. In other embodiments, the server 220 is further operative to determine this information by comparing, correlating, or associating the location 222 and/or the route information 226 with the data 216 in the navigation database 214. This may happen, for example, when the location 216 simply comprises bare coordinates. Accordingly, the server 220 may determine what road(s) 104 the mobile device 162 is on, near, and/or traveling along, and/or what intersection(s) 106 and/or point(s) of interest 108 that the mobile device 162 is at, near, and/or traveling towards or away from.

The server 220 is further operable to receive provider data 231 indicative of the customer service process 150 and/or the customer service requestor 154 from the customer service provider 152. The provider data 231 may, for example, indicate that the customer service requestor 154 is, overall, a valued customer. This might be because, for example, the requestor 154 spends or spent over a threshold amount, buys or bought premium services and/or goods, and/or the requestor has been a customer, user, and/or consumer of the goods and/or services of the customer service provider 152 for a significant or defined amount of time. The provider data 231 may also, for example, be indicative of the nature and/or circumstances (e.g., the tone, length, etc.) of the specific customer service session 150. The provider data 231 may be indicative of the tone of the customer service session 150 (e.g., the customer service requestor 154 is or is not being friendly and/or patient during the customer service session 150, the customer service 156 requested during the session 150 (e.g., the customer service 156 concerns a significant purchase and/or a significant amount of money), and/or other information about the customer service session 150. The data 231 may be further indicative of the type of content 202 that the customer service provider 152 wishes to provide. The data 231 may, for example, indicate that the customer service provider 152 only wishes to provider certain types of the content 202 (e.g., no benefits), is willing to spend up to, but not more than, a certain amount on or for the content 202 (e.g., the benefit may not exceed $100), and/or other restrictions or guidelines relating to the content 202.

Once the server 220 receives the geographic location 222 and/or the route information 226 and, optionally, the provider data 231, the server 220 is further operative to automatically identify, select, or determine the content 202 based on the geographic location 222, the route 226, the queue information 230, the provider data 231, or combinations thereof. The server 220 may identify or determine the content 202 by correlating or analyzing the current or predicted/anticipated location data 222, route data 226, queue information 230, provider data 231, or combinations thereof with the geographic data 216 and/or the offer data 218 stored in the navigation database 214. This ensures that the content 202 identified or determined by the server 220 is or may be relevant to the customer service requestor 154, particularly the requestor's location 222. The content 202 is or may also be relevant to the customer service session 150, the route 226, the queue information 230, and/or the provider data 231.

Alternatively, the content 202 may be manually identified or selected by the customer service provider 152 based on the geographic location 222, the recognized route 226, the queue information 230, the provider data 231, or combinations thereof. For example, the customer service provider 152 may manually choose to provide the requestor 154 with specific content 202 when the requestor 154 is friendly, the requestor 154 has been or was on hold for a long period of time, and/or the customer service 156 requested concerns involves a significant purchase (e.g., a $1000 computer) and/or a significant amount of money (e.g., the customer service requestor 154 is calling about a $500 utility bill).

In some embodiments, the content 202 identified by the server 220 includes one or more benefits 232 selected from the offer data 218. The one or more benefits 232 may be valid, redeemable, or usable at one or more of the points of interest 108, such as at a merchant, retailer, and/or service provider. The server 220 may identify or select one or more benefits 232 for points of interest 108 proximate to the determine geographic location 222 in the geographic region 102, located along and/or near the recognized route 226, located in the direction that the mobile device 162 is traveling, affiliated or not affiliated with the customer service provider 154, that the server 220 identifies as being not crowded or busy (using, for example, some sort of check-in or feedback service), or combinations thereof. For example, the benefit 232 may be for the point of interest 108 that the server 220 determines is closest to the determined geographic location 222 and/or the route 226. The one or more benefits 232 may be in the form of a coupon, voucher, discount, gift card or certificate, and/or other benefit and may be valid, usable, or redeemable during and/or after the customer service session 150. The one or more benefits 232 may, for example, be valid, usable, or redeemable for a certain period of time (e.g., four hours) following the customer service session 150. In one specific embodiment, the benefit 232 is a voucher for a free coffee at an unaffiliated Starbucks® coffee shop two blocks away from the location 222 that is only redeemable while the customer service session 150 is ongoing and/or within a preset time (e.g., 1 hour) following the end of the customer service session 150.

Alternatively, or in addition thereto, the content 202 identified by the server 220 may include one or more locations 234 (see FIG. 1) at which the customer service requestor 154 should or may participate in the customer service session 150. The location 234 may be, for example, one of the points of interest 108, such as a coffee shop, that the server 220 identifies as being quiet and/or not crowded and would, thus, be conducive to participation in the customer service session 150. In one embodiment, the location 234 corresponds to the point of interest 108 for which the benefit 232 is provided, such that the customer service requestor 154 may use or redeem the benefit 232 and participate in the customer service session 150 at the same location. The location 234 may also be one in which the telephone network 158 and/or another communication channel is available and/or strong, such that the customer service session 150 will not be interrupted. The location 234 may or may not be proximate to the location 222 of the mobile device 162 and/or may or may not be located along or proximate to the recognized or determined route 226.

Alternatively, or in addition thereto, the content 202 identified by the server 220 may include one or more locations 238 that the customer service requestor 154 should avoid during the customer service session 150. The one or more locations 238 may, for example, correspond to one or more of the points of interest 108, such as a tall building, elevator, underground train platform, etc., at which the telephone network 158 and/or another communication channel is unavailable and/or at which the signal of or connection to the communication channel is weak and/or unverified. The one or more locations 238 to avoid may or may not be proximately located to the location 222 and/or located along the recognized route 226 (if the server 220 has detected one). In one embodiment, the one or more locations 234 represent the points of interest 108, proximate to the location 222, in which the communication channel is unavailable, when, for example, the queue information 230 indicates that the customer service provider 152 will be able to provide the customer service 156 very shortly or that the customer service provider 152 will initiate or re-initiate (e.g., by calling back) the customer session 150 shortly thereafter.

Moreover, the content 202 identified by the server 202 may further include data 240 indicative of other customer service requestors 242 simultaneously involved in another customer service session 240, either with the customer service provider 244 or another customer service provider, and located proximate to the geographic location 222 of the mobile device 162. The other customer service requestors 242 may be friends, family, and/or social acquaintances of the customer service requestor 154 identified by the server 220 using a location-based social networking platform 246, such as Facebook, Four-Square, Google Latitude, etc. Accordingly, the data 240 identifies friends, family, and/or acquaintances of the customer service requestor 154 who are likewise involved in a customer service session. Using the data 240, the requestor 154 and one or more of the requestors 242 may choose to meet up while each is involved in his/her respective customer service session 150, 244. This is particularly beneficial when both requestors 154, 242 are on-hold or waiting to receive customer service.

Alternatively, or in addition thereto, the content 202 identified by the server 220 may include navigation guidance 246. The navigation guidance 246 may include audio and/or written and/or visual navigational guidance, such as one or more maps, one or more calculated routes, etc. The navigation guidance 246 may direct or guide the requestor 154 from the location 222 to the point of interest 108 for which the benefit 232 is provided and/or to the one or more locations 234 at which the customer service requestor 154 should or may participate in the customer service session 150. The navigation guidance 246 may be especially helpful to the requestor 154 when the location 234 is not proximate to the location 222 and/or is not located along or near the route 226. The navigation guidance 246 may also serve to direct or guide the customer service requestor away from the one or more locations 238. The navigation guidance 246 may also direct or guide the customer service requestor 154 to the location of one or more of the customer service requestors 242 that the requestor 154 wishes to meet up with or to a designated or determined meeting place or central location in which the one or more requestors 242 may meet with the requestor 154. The navigation guidance 246 may include directions or guidance for a route that is similar to or corresponds with the route 226, is different than the route 226, and/or that modify the route 226 (e.g., when one or more of the locations 238 lies along the route 226). The navigation and/or route guidance 226 displayed or provided via the mobile device 156 may be generated by the server platform 204, the mobile device 156, and/or combinations thereof. Methods for calculating and providing route guidance using geographic data are disclosed in, for example, U.S. Pat. No. 6,199,013, the entire disclosure of which is incorporated herein by reference.

After the server 220 identifies or selects the content 202, the server 220 is operative to provide or transmit the content 202 to the customer service requestor 154. The content 202 is transmitted or provided during the customer service session 150 (e.g., while the customer service 156 is being provided to the customer service requestor 154) or contemporaneously with or proximate to the end of the customer service session 150. In other words, the content 202 is provided within a time period after the customer service session 150 such that the determined location 222 and/or route 226 are still relevant. The content 202 may be transmitted or provided before or after the customer service 156 has been provided to the customer service requestor 154 during the session 150. The content 202 may be provided to the customer service requestor 154 via or over the telephone network 158 and/or via or over another communication channel (e.g., email, SMS, etc.). In one embodiment, the server 220 is further operative to be transmit or provide a customer survey 250 that asks questions and/or seeks comments about the specific customer service session 150 or the customer service provider 152 in general. The customer survey 250 may be transmitted along with or after the content 202. The survey 250 may be transmitted via the telephone network 158 or via another communication channel.

The customer service platform 204 may further include a monitoring system 260 that generally measures or monitors the effectiveness of the system 200. The monitoring system 260 may operative to monitor or track distribution of the content 202, particularly where the content 202 is manually identified or selected, evaluate customer surveys 250 and/or otherwise determine the receptiveness or happiness of the customer service requestors 154, and/or measure or determine the usefulness of the content 202 provided. By monitoring or tracking distribution of the content 202, the system 260 may help the customer service provider 152 and/or the platform operator 206 identify excessive or inappropriate (and potentially fraudulent) distribution of the content 202. The system 260 may also gather, monitor, or collect data relating to the redemption rate of the one or more provided benefits 232. In total, the system 260 allows the customer service provider 152 to monitor or measure its return on investment of the entire system 200.

Further yet, the customer service provider 152 may determine which type of customer service 156 to provide or how to provide that customer service 156 to the customer service requestor 154 based on the determined geographic location 222 of the mobile device, the recognized route 226, and/or the queue information 230. For example, the customer service provider 152 may provide the customer service requestor 154 with more or less detailed customer service depending on whether the customer service requestor 154 is located in a quiet location, is capable of understanding or recording (e.g., writing down) the customer service instructions, and/or is near the product or service (e.g. computer) that is the subject of the customer service session 150 in the first place.

Figure 6:
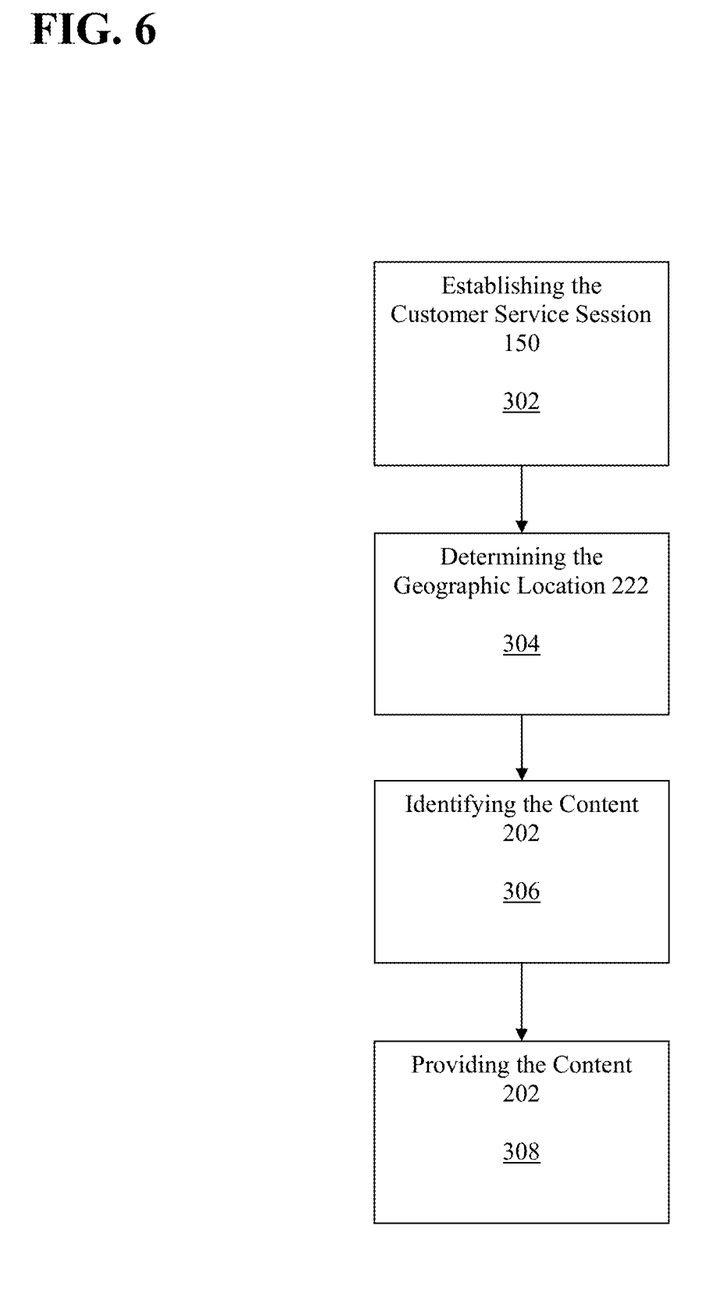
FIG. 6 depicts a flow chart showing operation of the system in FIG. 4.

Referring to FIG. 6, there is shown a flow chart depicting the operation of the system 200 for providing location-based content according to one embodiment. In one embodiment, the system 200 includes the customer service platform 204, implemented as a computer having a processor and a memory coupled thereto.

The operation or method includes establishing the customer service session 150 between the communication device 160 associated with the customer service provider 152 and the mobile device 162 of the customer service requestor 154 via the communication channel 158 (act 302). As described above, the customer service session 150 may be established by the customer service requestor 154 or the customer service provider 152 and may be established in any number of ways. The operation further includes determining the geographic location or position 222 of the mobile device 162 (act 304). The location 216 may be determined in any number of ways, as described above.

The operation or method further includes identifying the content 202 based on the determined geographic location 222 of the mobile device 162 (act 306). The operation further yet includes providing, during or after the customer service session 150, to the customer service requestor 154 via the mobile device 162, the identified or determined content 202 (act 308). As described herein, the content 202 may include one or more benefits 232, the one or more locations 234, the one or more locations 238, the data 240, the route guidance 246, or combinations thereof.

In one embodiment, the operation further includes recognizing or determining the route 226 over which the mobile device 162 is traveling. The recognizing may be based on previous routes over which the mobile device 162 has traveled, based on two or more determined locations 222 of the mobile device 162, and/or based on the location 222 of the mobile device 162 and a list of common routes.

In one embodiment, the operation further includes providing or presenting the customer service provider 152 with the determined location 222 and/or the recognized route 226 of the mobile device 162. More specifically, the operation may include providing or presenting the customer service provider 152 with an audio description and/or visual indication (e.g., the map 100) of the location 222 of the mobile device 162 and/or the route 226 over which the mobile device 162 is traveling.

In one embodiment, the operation further includes providing, via the communication channel 158, during the customer service session 150 but before transmitting or exchanging the customer service 156, the customer service requestor 154 with the queue information 230.

In one embodiment, the operation or method includes identifying or selecting the content 202 based on the determined geographic location 216 of the mobile device and the provided queue information 230. In another embodiment, the content 228 may be identified or selected based on the geographic location 222 of the mobile device 162, the route 226 of the mobile device 162, and the provided queue information 230. In yet another embodiment, the content 202 may be identified or selected based on the route 226 and the provided queue information 230. In other embodiments, the content 202 may be identified or selected based on other combinations. The content 202 may be automatically identified by the platform 204 or may be manually identified or selected by the customer service provider 152 based on, for example, the determined geographic location 222 of the mobile device 162, the route 226, the provider data 231, or combinations thereof.

In one embodiment, the content 202 is provided via or over the telephone network 158. In another embodiment, however, the content 202 may be provided via another communication network (e.g., SMS, email, etc.). The content 202 may also be provided via or over the telephone network 158 and another communication channel.

Figure 7:
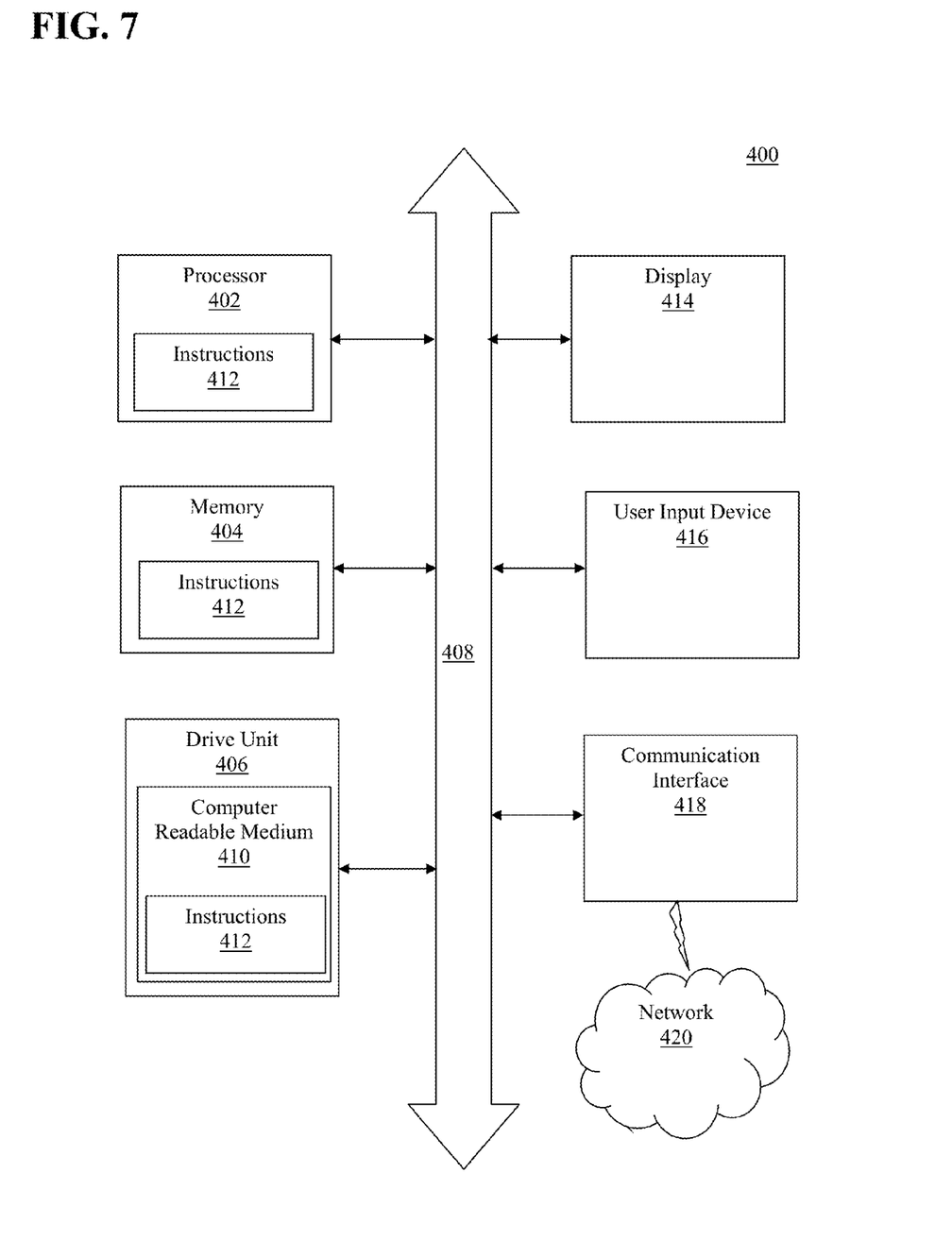
FIG. 7 depicts an exemplary computer system for use with the system of FIG. 4.

Referring to FIG. 7, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 7, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions stored in the memory 404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multi-tasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication port 918. The communication port 418 may be a part of the processor 402 or may be a separate component. The communication port 418 may be created in software or may be a physical connection in hardware. The communication port 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 900 may be physical connections or may be established wirelessly.

The network 420 may include wired networks, wireless networks, or combinations thereof, and may be representative of the networks 208 and/or 210. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:
1. A computer-implemented method comprising:
establishing, via a communication channel, a customer service telephone call between a communication device associated with a customer service provider and a mobile device associated with a customer service requestor;
identifying if the customer service requestor is qualified for receiving content including a compensatory benefit, wherein the customer service requester is qualified when the customer service requester has been or was on hold for a predetermined period of time;

if the customer service requester is qualified for receiving the content including the compensatory benefit, determining, by a processor, a geographic location of the mobile device;

identifying the content including the compensatory benefit based on the determined geographic location of the mobile device; and providing, by the processor, the content including the compensatory benefit, during or after the customer service telephone call, to the customer service requestor via the mobile device.

2. The computer-implemented method of claim 1, wherein the determining comprises determining the geographic location of the mobile device using a global positioning system (GPS), assisted GPS, or from the customer service requestor.

3. The computer-implemented method of claim 1, wherein the providing comprises providing the content via the communication channel.

4. The computer-implemented method of claim 1, wherein the providing comprises providing the content via another communication channel.

5. The computer-implemented method of claim 1, wherein the providing comprises providing the content during the customer service telephone call.

6. The computer-implemented method of claim 1, wherein the content comprises a benefit redeemable at a merchant located proximate to the determined geographic location.

7. The computer-implemented method of claim 6, wherein the benefit is only valid during or proximate to the customer service telephone call.

8. The computer-implemented method of claim 1, further comprising recognizing a route over which the mobile device is traveling.

9. The computer-implemented method of claim 8, wherein the content comprises a location along the recognized route at which the customer service requestor may participate in the customer service telephone call.

10. The computer-implemented method of claim 1, further comprising providing, via the communication channel, during the customer service telephone call but before exchanging the customer service, the customer service requestor with queue information, and wherein the identifying comprises identifying the content based on the determined geographic location of the mobile device and the provided queue information.

11. The computer-implemented method of claim 1, further comprising:

providing, via the communication channel, during the customer service telephone call but before receiving the customer service, the customer service requestor with queue information; and recognizing a route over which the mobile device is traveling;

wherein the identifying comprises identifying route guidance based on the recognized route and the provided queue information.

12. The computer-implemented method of claim 1, wherein the content comprises customer service requestor data indicative of one or more other customer service requestors simultaneously involved in another customer service telephone call and located proximate to the determined geographic location of the mobile device.

13. The computer-implemented method of claim 1, wherein the identifying comprises automatically identifying the content.

14. The computer-implemented method of claim 1, wherein the identifying comprises manually identifying the content based on the determined geographic location of the mobile device and the customer service requestor.

15. The computer-implemented method of claim 1, further comprising presenting the customer service provider with the geographic location of the mobile device during the customer service telephone call.

16. The computer-implemented method of claim 1, further comprising identifying customer service to provide to the customer service requestor based on the determined geographic location of the mobile device.

17. A system comprising:

a customer service platform including a processor in communication with a customer service requestor and a customer service provider; and a positioning device operable to determine, during a customer service telephone call established, via a communication channel, between a mobile device of the customer service requestor and a communication device associated with the customer service provider, a geographic location of the mobile device, wherein the processor is operable to select content including a compensatory benefit based on the determined geographic location of the mobile device and based on whether the customer service requestor is qualified for receiving content including the compensatory benefit, wherein the customer service requester is qualified when the customer service requester has spent over a threshold amount or has been a customer for a defined amount of time, and is operable to provide, during or after the customer service telephone call, to the customer service requestor via the mobile device, the selected content including the compensatory benefit.

18. The system of claim 17, further comprising a route recognition device operable to recognize a route over which the mobile device is traveling, wherein the customer service platform is operable to identify the content based on the determined geographic location of the mobile device and the route over which the mobile device is traveling, and wherein the content comprises a location along the recognized route at which the customer service requestor may participate in the customer service telephone call.

19. The system of claim 17, wherein the content comprises route guidance that includes a recommendation to avoid certain locations in which the communication channel may be unavailable.

20. A mobile device comprising:

a positioning device operative to determine, during a customer service telephone call established, via a communication channel, between the mobile device and a communication device associated with a customer service provider, a geographic location of the mobile device; and a processor operable to transmit the determined geographic location of the mobile device to a customer service platform and operable to receive from the customer service platform, during or after the customer service telephone call, content including a compensatory benefit selected based on the determined geographic location of the mobile device and based on whether the mobile device is qualified to receive content including a compensatory benefit, wherein the mobile device is qualified when the mobile device has been or was on hold for a predetermined period of time.

* * * * *